United States Patent
Kerl et al.

(10) Patent No.: US 11,564,117 B2
(45) Date of Patent: Jan. 24, 2023

(54) USER EQUIPMENT BASED NETWORK CAPABILITY SCORING FOR WIRELESS WIDE AREA NETWORK MANAGEMENT

(71) Applicant: Verizon Patent and Licensing Inc., Basking Ridge, NJ (US)

(72) Inventors: Paul Kerl, East Arlington, MA (US); Duane K. Scott, Conway, AR (US); Kevin Scott, Hilliard, OH (US); Michael Antony Raj, Basking Ridge, NJ (US); Vladimir Dakev, Temple Terrace, FL (US); Smitha Nagali, Plymouth, MI (US); Daniel Rushton, Pompano Beach, FL (US); Jayanthi Chinnasami, Bridgewater, NJ (US); John N. Wakim, Salem, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 84 days.

(21) Appl. No.: 17/106,935

(22) Filed: Nov. 30, 2020

(65) Prior Publication Data
US 2022/0174518 A1    Jun. 2, 2022

(51) Int. Cl.
*H04W 24/08* (2009.01)
*H04L 43/0888* (2022.01)

(52) U.S. Cl.
CPC ......... *H04W 24/08* (2013.01); *H04L 43/0888* (2013.01)

(58) Field of Classification Search
CPC ............................ H04W 24/08; H04L 43/0888
See application file for complete search history.

(56) References Cited

U.S. PATENT DOCUMENTS

| 10,419,949 | B2 * | 9/2019 | Griff | H04W 4/029 |
|---|---|---|---|---|
| 11,006,293 | B1 * | 5/2021 | Singh | H04W 24/04 |
| 2011/0312316 | A1 * | 12/2011 | Baldemair | H04B 17/101 |
| | | | | 455/422.1 |
| 2013/0115959 | A1 * | 5/2013 | Amirijoo | H04W 36/00837 |
| | | | | 455/440 |
| 2013/0201842 | A1 * | 8/2013 | Chou | H04W 28/08 |
| | | | | 370/252 |
| 2014/0073306 | A1 * | 3/2014 | Shetty | H04W 36/0088 |
| | | | | 455/418 |
| 2014/0155080 | A1 * | 6/2014 | Austin | H04W 36/22 |
| | | | | 455/453 |

(Continued)

FOREIGN PATENT DOCUMENTS

| EP | 2782381 A1 * | 9/2014 | H04W 24/02 |
|---|---|---|---|
| EP | 3174329 B1 * | 11/2020 | H04W 24/02 |
| WO | WO-2021164873 A1 * | 8/2021 | |

*Primary Examiner* — Shah M Rahman

(57) ABSTRACT

A method for user equipment (UE) based network capability scoring for wireless wide area network management includes receiving parameters associated with a performance of a network, user equipment devices network utilization, and/or user application requirements. The method further includes determining throughput evaluations of data exchanges between UEs and sectors associated with cell sites within the network, and identifying device performance scores based on the throughput evaluations. The device performance scores may be adjusted based on at least one independent metric. The method may evaluate sectors based on the identified device performance scores.

25 Claims, 8 Drawing Sheets

(56) References Cited

U.S. PATENT DOCUMENTS

| | | | | |
|---|---|---|---|---|
| 2014/0200036 A1* | 7/2014 | Egner | ................... | H04W 64/00 455/456.3 |
| 2014/0213256 A1* | 7/2014 | Meylan | ................. | H04W 48/18 455/436 |
| 2014/0269269 A1* | 9/2014 | Kowali | ................. | H04W 24/04 370/252 |
| 2015/0056995 A1* | 2/2015 | Baillargeon | ...... | H04W 36/0022 455/436 |
| 2015/0098393 A1* | 4/2015 | Tofighbakhsh | ..... | H04L 41/0816 370/329 |
| 2015/0208254 A1* | 7/2015 | Pansana | ............... | H04B 7/0689 455/418 |
| 2015/0223093 A1* | 8/2015 | Zhang | ............... | H04W 28/0268 370/252 |
| 2016/0044692 A1* | 2/2016 | Egner | ..................... | H04L 5/006 370/330 |
| 2016/0135067 A1* | 5/2016 | Morad | ................... | H04M 15/41 455/423 |
| 2016/0269911 A1* | 9/2016 | Cheng | ................... | H04W 16/18 |
| 2016/0286410 A1* | 9/2016 | O'Malley | ............. | H04W 24/02 |
| 2017/0238275 A1* | 8/2017 | De Pasquale | ....... | H04W 64/006 370/252 |
| 2017/0353927 A1* | 12/2017 | Neubacher | ........ | H04W 52/0248 |
| 2019/0036788 A1* | 1/2019 | Gupta | ................. | H04L 67/1004 |
| 2019/0082394 A1* | 3/2019 | Abdelmonem | ...... | H04B 17/345 |
| 2019/0319868 A1* | 10/2019 | Svennebring | ......... | H04W 24/08 |
| 2020/0022006 A1* | 1/2020 | Froehlich | ............. | G06F 11/3447 |
| 2020/0029240 A1* | 1/2020 | Li | ..................... | H04W 28/0226 |
| 2020/0162336 A1* | 5/2020 | Gonguet | ............ | H04L 41/5009 |
| 2020/0259896 A1* | 8/2020 | Sachs | ................. | G07C 9/00174 |
| 2020/0351201 A1* | 11/2020 | Li | ......................... | H04L 67/535 |
| 2021/0112425 A1* | 4/2021 | Tran | .................... | H04B 17/318 |
| 2021/0136177 A1* | 5/2021 | Hall | ................. | H04L 41/5051 |
| 2021/0337400 A1* | 10/2021 | Jat | ......................... | H04W 24/08 |
| 2022/0021469 A1* | 1/2022 | Veijalainen | ............ | H04B 17/29 |

* cited by examiner

USER EQUIPMENT BASED NETWORK CAPABILITY SCORING FOR WIRELESS WIDE AREA NETWORK MANAGEMENT

BACKGROUND

Increased demand for wireless networking services drives the deployment and optimization of wireless wide area network (WWAN) services. WWAN optimization is designed to increase performance, availability, and/or reliability of wireless communication among various network infrastructure devices and/or mobile devices. Since the infrastructure of the WWAN can be highly complex and extend over large geographical regions, conventional approaches for optimizing services can be enhanced by improving the depiction of the user experience with the WWAN.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

Embodiments described herein include a network management system and processes for wireless wide area networks (WWANs). The network management system may generate optimization recommendations based on device performance scoring. In an exemplary embodiment, an automated system and/or method may create a list of cell site upgrades and capacity driven cell site optimizations, and/or additional site placements that improve user experience. Embodiments may utilize the UE device type and plans, as well as UE mobility patterns, application usage, current cell site configurations, radio frequency (RF) conditions, topography, location of existing cell sites and/or geolocated usage to score devices' performance levels and recommend optimized prescriptive solutions for cell sites and/or particular sectors within a cell site. In formulating recommendations, embodiments may take into account, for example, dynamic geospatial and/or temporal UE connections and movement to prescribe an accurate device performance score that may account for stochastic network conditions.

Exemplary embodiments may also automate and optimize site placement recommendations through capacity offload capacity prediction, and may subsequently translate the prediction into optimization recommendations. Such recommendations may include, for example, performance, reliability, and/or network upgrades. These recommendations, for example, may include carrier additions, antenna upgrades, and/or new cell site build placements. New cell site builds may be based on Fifth Generation (5G) standards (including New Radio (NR) air interface standards), Long Term Evolution (LTE) wireless standards (e.g., LTE, LTE Advanced, etc.), and/or any other existing WWAN standards. Accordingly, new cell site builds may include macro cell sites, small cell sites, and/or ultra wide-band (UWB) nodes. As used herein, "recommendations" may include various guides, rules, and/or detailed plans of action for optimizing WWAN capability. As used herein, the term "optimize" or "optimization" of the WWAN upgrades may be generalized to include WWAN modifications or other upgrades that make improvements to the performance and/or functionality of the WWAN, in addition to upgrades that may make the best and/or most effective improvements to the performance and/or functionality the WWAN based upon available resources.

Figure 1:
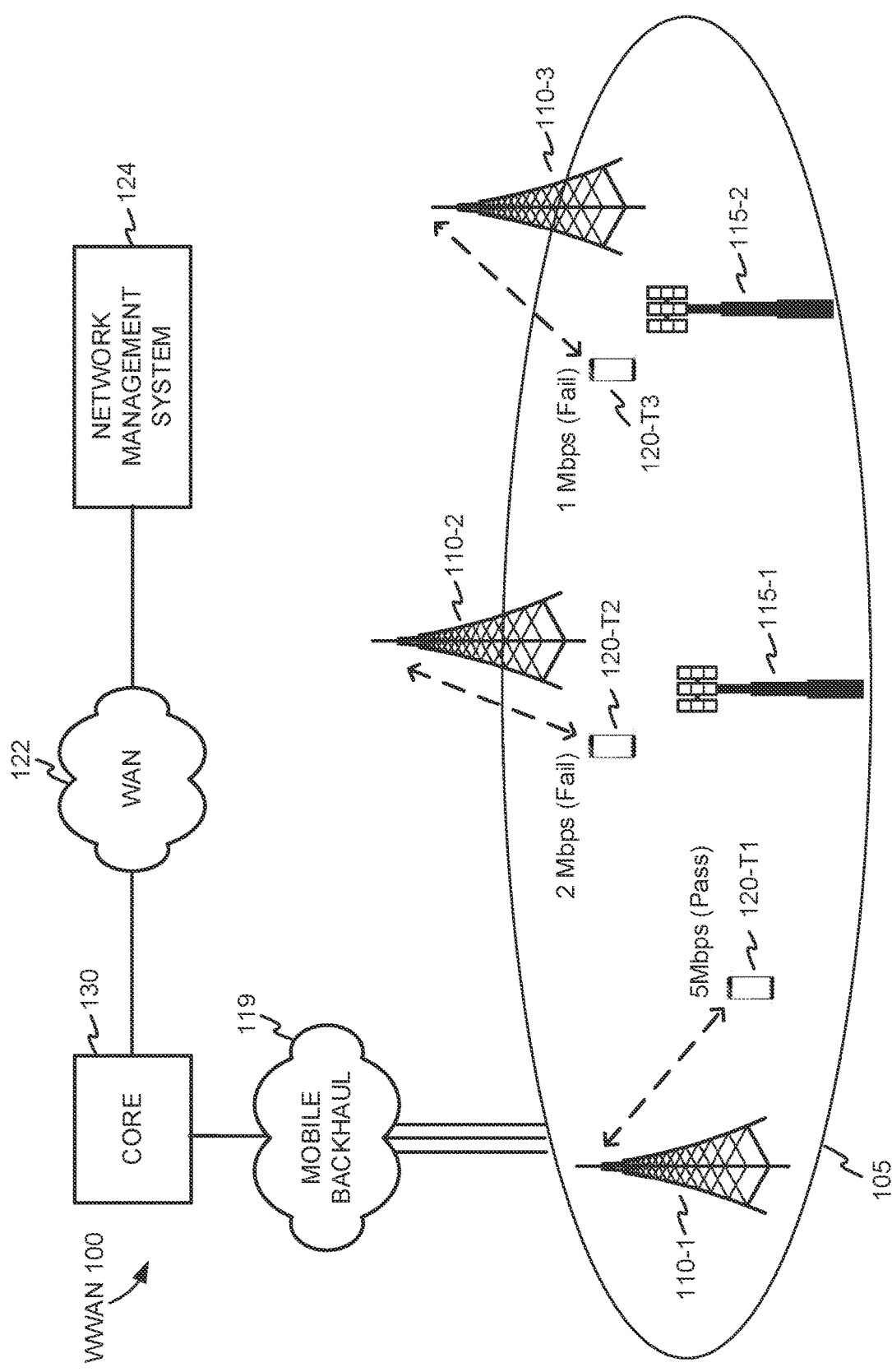
FIG. 1 is a diagram showing an exemplary WWAN environment associated with a network management system according to an exemplary embodiment.

FIG. 1 is a diagram showing an exemplary WWAN 100 environment associated with a network management system (NMS) 124 according to an embodiment. WWAN environment 100 may include a geographical region 105, cell sites 110 (herein referred to plurally as "cell sites 110," generically as "cell site 110," and individually as "cell site 110-x"), potential new cell sites 115 (herein referred to plurally as "potential new cell sites 115," generically as "potential new cell site 115" and individually as "potential new cell site 115-x"), mobile backhaul 119, core 130, WAN 122, NMS 124, and user equipment device (UE) 120. In FIG. 1, UE 120 is depicted in three separate instances of time, and is thus labeled UE 120-T1, UE 120-T2, and UE 120-T3, to indicate three separate time instances T1, T2, and T3. While only one UE 120 is shown in WWAN 100 for ease of explanation, it should be appreciated that embodiments described herein may operate with many UEs 120 that can be exchanging data with cell sites 110 in WWAN 100. Additionally, UE 120 is shown in FIG. 1 for only three instances of time for ease of explanation, it should be appreciated that embodiments described herein may include UEs 120 which may be connected with WWAN 100 in more instances of time than just three.

Cell sites 110 may exchange traffic data with core 130 via mobile backhaul network 119. In some embodiments, mobile backhaul network 119 may further exchange data between cell sites 110 without having to go through core 130. Core 130 may further exchange data via WAN 122 to communicate with other various network devices. In the embodiment illustrated in FIG. 1, NMS 124 may be included in WWAN 100 and exchange data with other network devices via WAN 122 and/or core 130. However, in other embodiments, NMS 124 may not be interconnected to WWAN 100.

One or more sectors associated with cell sites 110 within geographical region 105 may be selected as candidate(s) for recommendations for various optimizations. As used herein, a "sector" may refer to a portion of a cell site 110-x which produces a wireless coverage area. In an embodiment, the selection of sectors of cell sites 110 recommended for upgrades may be automatically determined by NMS 124 based on sector capacity optimization recommendations which may be determined by analyzing the data throughput of UE 120 over different times and/or different sectors, and comparing actual throughput numbers with prescribed target data throughput values. The prescribed target data throughput values may be calculated, for example, based on a user's data plan, the user's application level needs, and/or the type of UE 120 being used to access WWAN (e.g., smartphone, tablet, laptop, internet of things (IoT) device, etc.). Over various time periods and geographical locations supported by different cell sites and/or sectors, a large number of evaluations can be made with many UEs 120 within WWAN 100 to determine whether the throughput available to the UEs 120 have met or exceeded the prescribed target throughputs (e.g., designated as a "Pass"), or experienced data throughputs which were below the prescribed throughput targets (e.g., designated as "Fails"). Such Pass/Fail comparisons can be tracked on a per sector basis, and subsequently aggregated in the form of a quantitative evaluation on a per sector basis. The aggregated throughput comparisons may then be mapped into distinct ranges, or "bins," which are associated with (i.e., mapped) to device performance scores. The device performance scores may then be used to derive UE-based sector scoring. The UE based sector scoring can be used to determine sector capacity optimization recommendations, which may indicate various optimizations to the cell site hardware and/or software associated with the sector. Additionally or alternatively, the UE based sector scoring may be used to assist in the recommendation of potential new cell sites which may be added to provide additional capacity to WWAN 100.

FIG. 1 shows an exemplary illustration of a single UE 120 in geographic area 105 determining throughput evaluations of data exchanges with sectors associated with cell sites 110-1, 110-2, and 110-3, at different times T1, T2, and T3, respectively. Embodiments described herein may establish wireless connections using any quality of service class identifier (QCI) such as, for example, QCI8 and/or QCI9. In the example shown in FIG. 1, wireless channel(s) may provide QCI9 wireless service to UE 120-T1 via a sector associated with cell site 110-1. A level of service provided to UE 120 may be defined, for example, in terms of a headroom for data rate exchanges hereinafter defined as "throughput potential." The throughput potential may be determined at different times and/or different sectors and be performed by one or more devices within WWAN 100. For example, throughput potential determination may be performed by a cell site 110 exchanging the data with UE 120, by one or more devices within mobile backhaul 119, by one or more devices in core 130, by one or more devices in WAN 122, and/or by NMS 124.

As illustrated in FIG. 1, at time T1, a measurement of the data exchanged between UE 120-T1 and a sector of cell site 110-1 indicates a throughput of 5 megabits per second (Mbps). NMS 124 may compare the throughput potential to a prescribed throughput target that may be predetermined. The comparison at time T1 indicates that the throughput potential meets or exceeds a prescribed target throughput, and thus is designated as a "Pass." At time T2, the measurement of the throughput between a sector associated with cell site 110-2 and UE 120-T2 may be 2 Mbps. The comparison at time T2 indicates that the throughput potential fails to meet the prescribed target throughput, and thus is designated as a "Fail." Likewise, at time T3, the measurement of the throughput between a sector associated with cell site 110-3 and UE 120-T3 may be 1 Mbps. The comparison at time T3 indicates that the throughput potential fails to meet the prescribed target throughput, and thus is designated as a "Fail." The result of these comparisons may be expressed in a binary Pass/Fail manner over many trials of measurements, which may be tracked on a per sector basis over many connections. The Pass/Fail results may subsequently be aggregated into throughput evaluations, which may be numerical in nature, for each sector and/or over multiple sectors for one or more UEs 120. The throughput evaluations may take the form of numerical values and can be determined based on statistics of the Pass/Fail comparisons. For example, in FIG. 1, one metric for aggregating throughput comparisons could be to determine, over a predetermined period of time, the ratio of the total number of "Fails" to the total number of connections across cell sites 110-1 thorough 110-3 for which UE 120 established connections. Additionally or alternatively, the duration of a particular state, such as, for example, the duration of "fails" in hours, may be considered in device performance scoring.

Accordingly, in the example shown in FIG. 1, an aggregate value may be determined as: AggFails=(No. of Fails)/Total No. Connections=⅔=0.67. Over time, as UE 120 moves within geographic area 105, many aggregate throughput comparisons may be performed and aggregate values determined. In order to better utilize the aggregate values, they may be quantized or "binned" based upon predetermined ranges into device performance scores. The device performance scores may be determined on a per sector basis, and thus be used to determine recommendations for cell sites 110 which may be consistently getting low scores. Additionally or alternatively, the device performance scores in-part may be used to suggest whether additional capacity should be supported by potential new cell sites 115 that may be added to WWAN 100.

The desirability for additional capacity may be based on quality metrics associated with WWAN 100, such as, for example, the number of dropped calls and/or packets, perceived voice quality, delay, and/or other quality metrics based on, for example, device performance scores. As used herein, the term "additional capacity" for WWAN 100 within geographical region 105 may refer to, for example, upgrades providing the ability to: wirelessly exchange more data; increase speed of data throughput; reduce latency; increase bandwidth; increase wireless coverage within geographical area 105; service a greater number of users within geographical area 105; and/or provide additional services and/or protocols (e.g., multimedia broadcast multicast service).

Further referring to FIG. 1, UE 120 may include any type of electronic device having communication capabilities, and thus communicate over networks using a variety of different channels, including channels having one or more wireless connections. UE 120 may include, for example, a mobile phone, a smart phone, a tablet, a Voice over Internet Protocol (VoIP) device, a laptop computer, a palmtop computer, an Internet of things (IoT) device using machine type communications (MTC), a gaming device, a media player device, or a digital camera that includes communication capabilities (e.g., wireless communication mechanisms). The operation of UE 120 may be based on any wireless communication standards supporting WWAN 100, including, for example, fifth generation (5G) (e.g., New Radio), fourth generation (4G) (e.g., LTE, LTE Advanced), GSM, UMTS, IS-2000, etc. In some embodiments, UE 120 may exchange data based on any Wi-Fi standard (e.g., any IEEE 801.11x network, where x=a, b, c, g, and/or n), and/or include any other type of wireless network technology for covering larger areas, and may include a mesh network (e.g., IEEE 801.11s) and/or a WiMAX IEEE 802.16. WWAN 100 may also include self-organizing networks (SONs).

Cell sites 110 and/or potential new cell sites 115 may operate with any type of radio access network, and may be compatible with known wireless standards. Such wireless standards may include, for example, fifth generation (5G) (e.g., New Radio), fourth generation (4G) (e.g., LTE, LTE Advanced), GSM, UMTS, IS-2000, etc. In some embodiments, cell sites 110 may include a wireless access point which can service any type of Wi-Fi standard (e.g., any IEEE 801.11x network, where x=a, b, c, g, n, ac, or other future versions), and/or include any other type of wireless network technology for covering larger areas, and may include a mesh network (e.g., IEEE 801.11s) and/or or a WiMAX IEEE 802.16. Cell sites 110 and/or potential new cell sites 115 may be embodied as any type of known cell site, which may include, for example, macro cells, micro cells, femto cells, etc.

Mobile backhaul network 119 may be any type of network which supports one or more cell sites 110 and potential new cell sites 115 for interfacing with core 130. Mobile backhaul network 119 may include Cell Site Routers (CSRs), Ethernet Backhaul (EBH) network(s), optical networks which include wavelength division multiplexed (WDM) optical components, multiservice provisioning platforms (MSPPs), metro-Ethernet networks, etc.

Core 130 may be any type of wide area wireless core networking infrastructure that provides, for example, wireless connectivity, mobility management, session management, broadcast (e.g., evolved multimedia broadcast multicast service (eMBMS)) functionality, authentication, and/or packet transport to support wireless communication between mobile devices and cell sites 110 and/or potential new cell sites 115. Core 130 may be compatible with known wireless standards which may include, for example, a 4G core network (e.g., LTE, LTE Advanced, etc.), a 5G core network (e.g., New Radio), Global System for Mobile Communications (GSM), Universal Mobile Telecommunications System (UMTS), IS-2000, etc.

WAN 122 may include any type of wired or wireless network covering larger areas. For example, WAN 122 may include a metropolitan area network (MAN), a Public Switched Telephone Network (PSTN), an ad hoc network, an intranet, the Internet, a fiber optic-based network, a wireless network, and/or a combination of these or other types of networks. WAN 122 may be an internet protocol (IP) based network or utilize Multi Protocol Label Switching (MPLS), and may include a mesh network (e.g., IEEE 801.11s) and/or a WiMAX IEEE 802.16. WAN 122 may include one or more circuit-switched networks and/or packet-switched networks.

NMS 124 may be any type of network device or computing device which may receive data traffic, network utilization information, and/or network configuration information regarding WWAN 100, and generate and provide network management for WWAN 100. Accordingly, NMS 124 may be implemented as a general processor-based system executing software (e.g., a server or other network device), embodied using dedicated hardware (e.g., ASICs, FPGAs, etc.), or as a combination thereof. NMS 124 may interface to core 130 thorough WAN 122 (as shown in FIG. 1), or may alternatively connect to 120 through a local interface. NMS 124 may interface to WAN 122 using an Ethernet connection over transmission control protocol/internet protocol (TCP/IP), where the physical interfaces may be any interface having sufficient resources to support the exchange of traffic alerts and traffic notifications. An interface may include, for example, 10 BASE-T, 1000 BASE-TX, and/or 1000 BASE-T over twisted pair, coaxial cable, and/or optical fiber. Alternatively, NMS 124 may connect with core 130 over a local area network using Ethernet and TCP/IP based networking standards.

Figure 2:
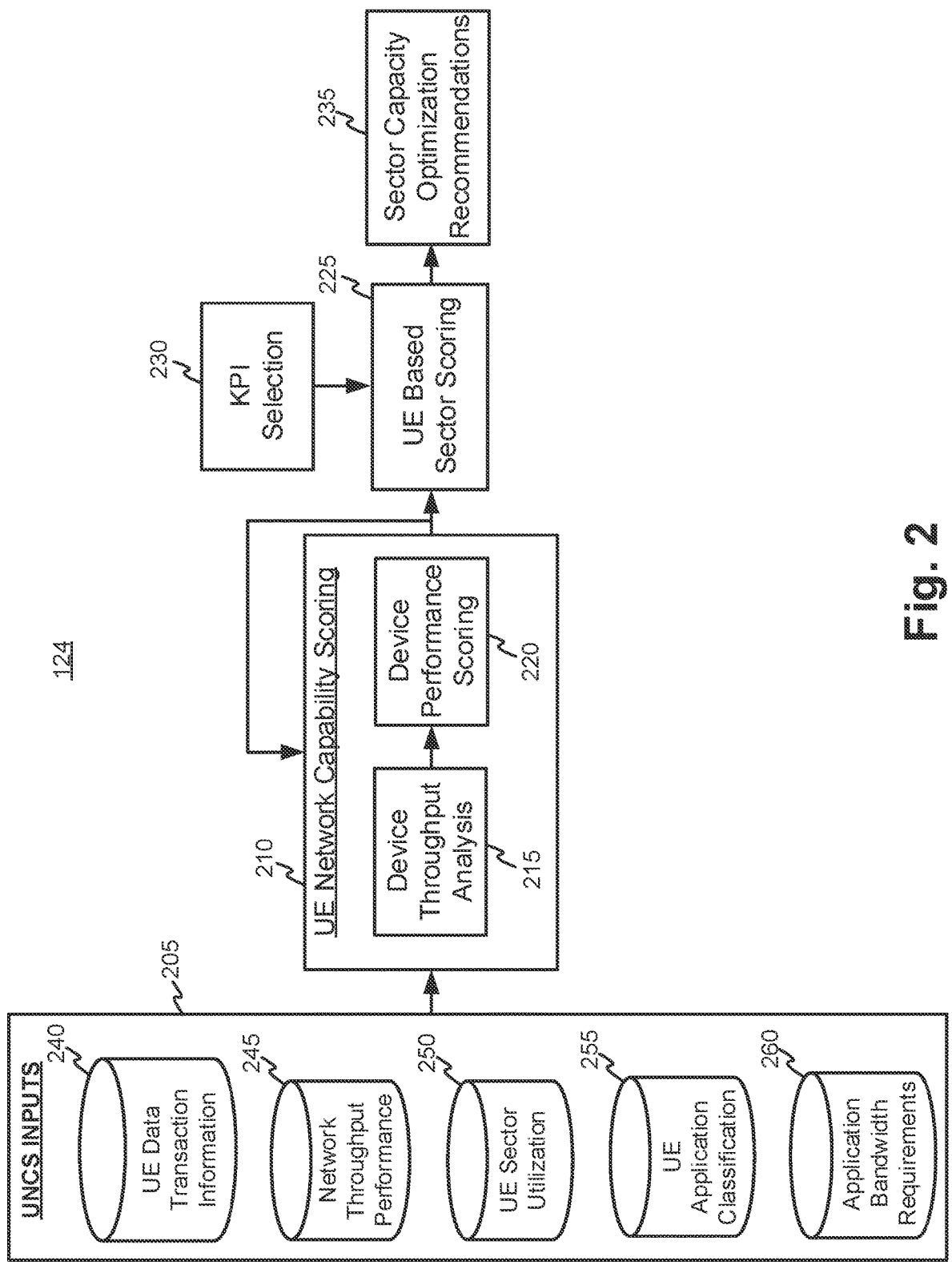
FIG. 2 is a block diagram showing an exemplary network management system based on device performance scores according to an embodiment.

FIG. 2 is a block diagram illustrating various inputs and modules for an exemplary NMS 124. NMS 124 may include UE network capability scoring (UNCS) inputs 205, UNCS 210, which may further include device throughput analysis 215 and device performance scoring 220. NMS 124 may further include UE-based sector scoring 225, key performance indicator (KPI) selection 230, and sector capacity optimization recommendations 235.

UNCS 210 can utilize various UNCS inputs 205 which may include information regarding the UE usage patterns in terms of throughput and applications used, application bandwidth requirements, and/or the utilization of sectors by users to assist a network provider in recommending upgrades to sectors in existing cell sites 110 and/or recommending the installation of new cell sites 115. Specifically, UNCS inputs 205 may include UE data transaction information 240, network throughput performance 245, UE sector utilization 250, UE application classification 255, and/or application bandwidth requirements 260.

UE data transaction information 240 may include histories of data flows within WWAN 110 as a function of time, and identifications of patterns of data flows through existing cell sites 110. For example, UE data transaction information 240 may include information associated with each call made by UEs exchanging data within WWAN 120 (e.g., UE 120), thus providing information on a "per call basis." This information may be individually designated for each UE 120 operating in WWAN 100, and/or grouped by particular users if that user operates multiple UEs 120 (e.g., uses both a smartphone and a tablet) in WWAN 100. In an embodiment, UE data transaction information 240 may include network scheduling delay and radio resource control (RRC) data to infer usage patterns within WWAN 110.

Network throughput performance 245 may include information providing metrics associated with data throughputs through WWAN 100 on a periodic basis. For example, the metrics may be obtained at predetermined intervals (e.g., hourly) at sectors associated with cell sites 110. The metrics may include various parameters indicating network throughput potential, and may include data rates, bandwidths, latencies, etc. UE sector utilization 250 may include information regarding historical usage patterns of UEs 120 with sectors associated with cell sites 110. Such patterns may track the time UE 120 was exchanging data with a particular sector/cell site 110, the amount of data, the number of connections, etc. UE application classification 255 may provide information identifying and/or classifying the applications being executed by UEs 120. The information may include the application type (e.g., email client, video viewer, browser, etc.), the name of the application (e.g., Outlook, Netflix, Safari, etc.) and/or the version of the application. Application bandwidth requirements 260 may include the bandwidth requirements in terms of data rates for applications residing and/or executing on UEs 120. The requirements may provide information in terms of an applications category (e.g., email client, video viewer, browser, etc.) and/or a specific application (e.g., Outlook, Netflix, Safari, etc.).

Further referring to FIG. 2, UNCS inputs 205 are provided to UNCS 210, which combines UNCS inputs 205 to determine, at a sector level, a device performance score based on a large number of throughput evaluations for UEs in WWAN 100. Within UNCS 210, inputs may initially be received at device throughput analysis 215. Device throughput analysis 215 may analyze a significant number of data records (e.g., over 50 billion records per day) to perform throughput evaluations of data exchanges between UEs 120 and sectors. In an embodiment, the throughput evaluations may include a throughput comparison to determine, in a binary fashion, whether data exchanges between UE 120 and sectors associated with cell sites 110 either meet or exceed prescribed throughput targets. For example, on a sector basis, the data throughput of UEs 120 may be compared with prescribed throughput targets. UEs 120 in WWAN 110 having throughput potentials which meet or exceed the prescribed throughput targets may be evaluated as a "pass." UEs 120 in WWAN 110 having data throughputs which fall below the prescribed throughput target may be evaluated as a "fail." A large number of binary throughput comparisons for UEs 120 may be performed by device throughput analysis 215 at different times and correlated with each sector, where the results can be aggregated into numerical values on a per sector basis. For example, percentages of "fails" may be determined using statistical analysis which may be correlated to each sector in WWAN 100.

In order to perform the data throughput evaluations for UEs 120 for each sector, device throughput analysis 215 may predetermine the prescribed throughput values for which data throughput potentials may be compared against. The prescribed throughput values used in the comparisons may be a function of a number of variables. Such variables may include one or more data requirements for application categories used in the data exchange (e.g., audio and/or video streaming, email, web browsing, etc.), details regarding the data plan associated with UE 120 (e.g., the type of data plan), and/or device classifications for UE 120. A device classification may include, for example a smartphone, a computer, a set-top box, a laptop, a tablet, any compatible data device, and/or a stationary 4G/5G antenna/receiver, etc.

Device throughput analysis 215 may provide the results of the throughput evaluations of the UEs' 120 data exchanges to device performance scoring 220. Device performance scoring 220 may identify device performance scores by segregating the throughput evaluations into distinct ranges, or "bins." Each bin of the throughput evaluations may be assigned (e.g., mapped) a particular device performance score. The device performance score may be based on any type of qualitative scale (e.g., "poor," "fair," "good," "excellent") and/or quantitative scale (e.g., 1 through 10), which may be associated with (i.e., mapped) distinct ranges of throughput evaluations. In an embodiment, a feedback loop may adjust the ranges, or bins, which are used to establish the device performance scores, (thus changing the ranges for the mapping of the device performance scores) based on an independent metric. In an embodiment, an independent metric may be based on polling of UEs 120 regarding the quality of their wireless connections. Alternatively or additionally, independent metrics may be based on other quality metrics that may be automatically collected and tracked within WWAN 100. One such example of an independent metric may be disconnection rates of wireless connections between UEs 120 and cell sites 110. Additionally or alternatively, another independent metric may be a "churn rate" (i.e., how many users fail to renew their service contracts due to dissatisfaction with their wireless service). These independent metric(s) may be used to "tune" the endpoints of the ranges for which throughput evaluations are binned, thus adjusting the scores produced by UE network capability scoring 210 via the feedback loop shown in FIG. 2.

Further referring to FIG. 2, UNCS 210 may provide device performance scores to UE based sector scoring 225 to map device performance scores to a sector score. UE based sector scoring processes produce a metric that characterizes the throughput performance of a sector by calculating a weighted sum of device performance scores and normalizing the scaling of the weighted sum based on the mobile telephone number count and the number of total connections. The weights may be determined to emphasize a particular category of performance. In an embodiment, UE based sector scoring 225 may further utilize key performance indicators (KPI) selection 230. For example, KPI selection may adjust values used in weighting by UE based sector scoring 225 based on KPI values for different types of equipment which may be present in a cell site 110.

Values from UE based sector scoring may be provided to sector capacity optimization recommendations 235, which may perform optimizations of objective functions to recommend various upgrades to sectors associated with cell sites 110. Recommendations may also include the addition of new cell sites 115, along with their location and/or operating parameters.

Figure 3:
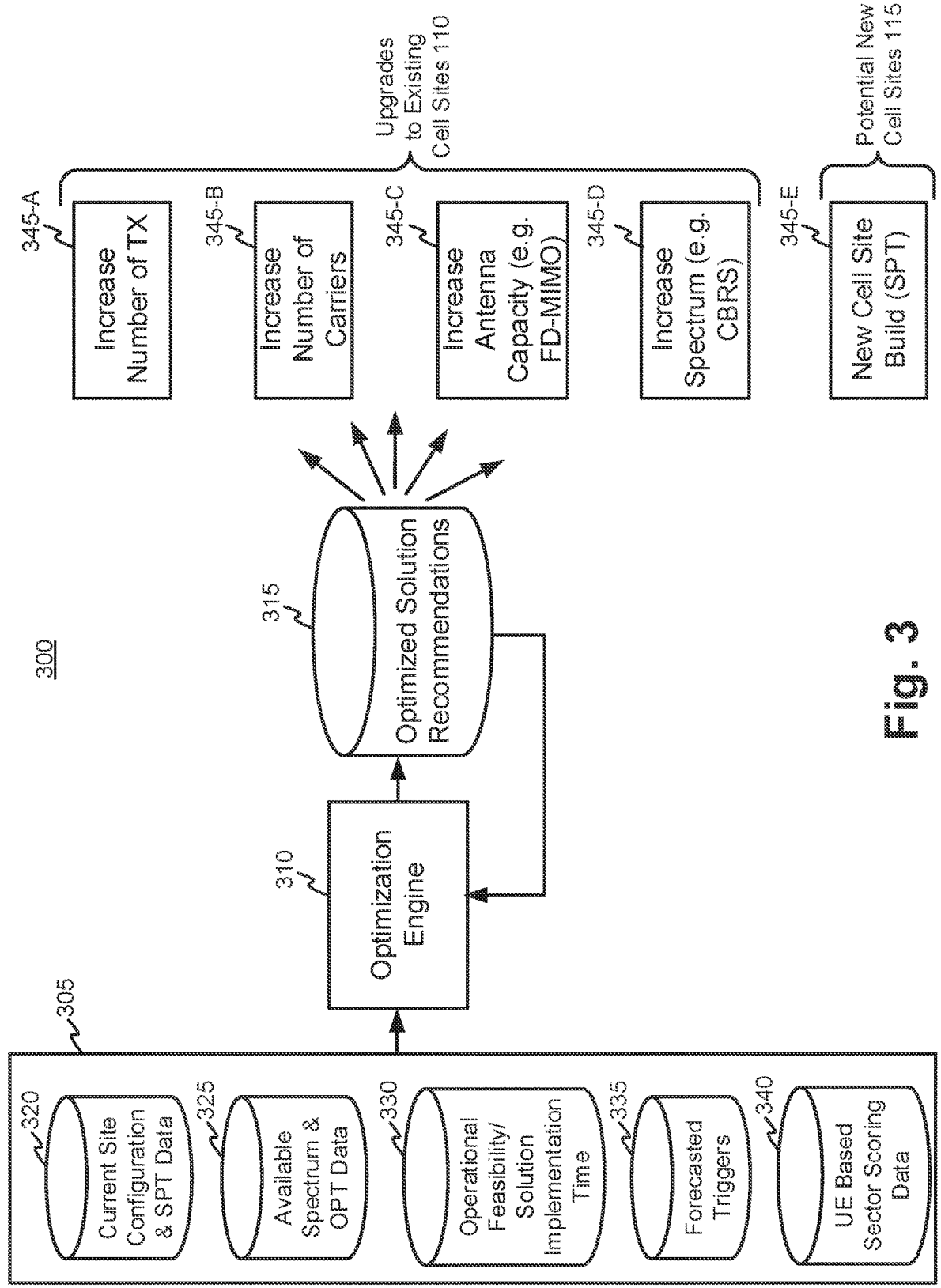
FIG. 3 is a block diagram illustrating details of sector capacity optimization according to an exemplary embodiment.

FIG. 3 is a block diagram illustrating details of sector capacity optimization 300 according to an embodiment. Sector capacity optimization 300 may include an optimization engine (OE) 310, which receives optimization inputs 305 to produce optimized solution recommendations (OSR) 315. OSR 315 may be determined for sectors having actual and/or projected constraints. The actual and/or projected constraints may be based on, in part, with the aggregated device throughput evaluations determined by device throughput analysis 215. The solutions determined by optimization engine 310 may be associated with sectors in existing cell sites 110 which may already be experiencing congestion in data traffic flows and would immediately benefit from increased data throughput capacity. In other embodiments, optimization engine 310 may provide recommendations to OSR 315 for sectors that are predicted to have congestion in data traffic in the future, based on foreseeable growth in WWAN 100 usage (e.g., forecasted capacity triggers).

OSR 315 may rely upon one or a combination of approaches for implementing improvements to WWAN 100, which may include, for example, upgrades to cell sites 110 that: increase the number of transmitters (TX) 345-A; increase the number of carriers 345-B; increase antenna capacity (e.g., frequency division multiple input multiple output (FD-MIMO) 345-C; and/or increase spectrum 345-D (e.g., add Citizens Broadband Radio Service (CBRS), provide carrier aggregation, utilize additional unlicensed spectrum, etc.). Optimized solution recommendations 315 may further include building new cell sites 345-E based on models from a solution placement tool (SPT), and/or an offload prediction tool (OPT). SPT may automatically determine possible locations of potential new cell sites 115 in geographical region 105. OPT may also estimate the data throughput of the potential new cell sites 115 by modeling the effectiveness of all of the potential new cell sites 115 in offloading data traffic from existing cell sites 110. OPT may also predict the associated user impact of any recommended network improvement. The solution recommendations may consider any combination of approaches 345-A through 345-E, and may further include future technologies (e.g., approaches associated with the 5G wireless communication standard). Moreover, OSR 315 may rely upon one or a combination of approaches for optimizing self-organizing networks (SONs), which may include recommendations for hardware and/or software upgrades and/or cell splits. OSR 315 may provide optimizations for distributed SONs (D-SONs), centralized SONs (C-SONs), and/or hybrid SONs.

In more detail, sector capacity optimization 300 may be used for anticipating WWAN 100 throughput capacity in view of various potential upgrades motivated in-part by device performance by modeling a list of targeted cell site sectors and solutions for capacity planning. As inputs, optimization engine 310 may include current cell site 110 location/configuration and potential new cell site 115 location/configuration including SPT information 320, available spectrum and OPT information 325, operational feasibility data and solution implementation time information 330, forecasted capacity triggers 335, and UE based sector scoring data 340. UE based sector scoring data may be produced by UE based sector scoring 225 shown in FIG. 2, which is described in more detail below in reference to FIG. 8.

From these inputs, OE 310 may use a multivariate optimization math model for generating optimal solution recommendations 315. The multivariate optimization math model may include, for example, a mixed integer linear programming problem (MILP) formulation. Decision variables designated by MILP may include whether to upgrade a specific cell site 110 (or portion thereof) or not. An objective function may be used by MILP which may, for example, maximize the highest customer impact in-part based on device performance scores, or other objectives relating to upgrading the network (e.g., maximizing capacity added, and/or cell sites upgraded, etc.). Various constraints may be used in the optimization process. For example, constraints may include market area related constraints (where the market can be any possible geographic boundary such as, for example, a cellular market area) to prevent overbuilding a site and/or underbuilding in cities or other market areas; operational feasibility constraints (e.g., limitations on quantity of builds per year); and/or decisions whether to upgrade cell sites 110 that are proximate to an existing cell site 110-x which is to be upgraded. In some implementations, OE 310 may use a solution rejection feedback loop to improve the optimization process by training the algorithm to avoid specific rejected solutions in an automated manner. Thus, the rejection feedback loop may avoid inefficiencies and/or redundant solutions.

Accordingly, OE 310 determines practical recommendations based on device performance scores, business criteria (such as consumer demand), types of potential new cell sites 115 (e.g., macro sector on tall tower versus small cell on telephone pole, structure type). In more detail, referring to FIG. 3, current site configuration and SPT data 320 may include information regarding existing cell sites 110 and potential new cell sites 115. Available spectrum and OPT data 325 may include the spectrum currently available for use within the geographical region 105, what spectrum may be available for licensing, etc. Operational feasibility 330 may include information associated with operating cell sites at geographical region 105, radio frequency (RF) interference issues, spectrum licensing, etc. Solution implementation time 330 may include implementation effort (e.g., time and/or manpower requirements based on cell site type, geography, etc.), and/or a measure of the level of effort required for upgrading existing cell sites 110 and/or installing potential new cell sites 115. Forecasted capacity triggers 335 may include information providing indicators of one or more sectors in geographical region 105 which may benefit from upgrades implementing additional capacity. Determining forecasted capacity triggers 335 may be based on, for example: throughput potential indicating the amount of data that may be exchanged within WWAN 100, wherein the throughput potential can be associated with specific times (e.g., rush hour); the average headroom and/or capacity for additional data exchange within WWAN 100; error rates; and/or congestion metrics. Additionally or alternatively, forecasted capacity triggers 335 may be based on quality metrics associated with WWAN 100, such as, for example, the number of dropped calls and/or packets, perceived voice quality, delay, and/or other quality metrics based on user feedback. In conjunction with optimization engine (OE) 310, a service provider may determine which geographical regions 105, and/or sectors therein, may receive the greatest benefit from upgrades to WWAN 100, thus maximizing the benefit for the effort expended in implementing upgrades to WWAN 100.

UE based sector scoring data 340 may be generated by UE based sector scoring 225, as described above with reference to FIG. 2. UE based sector scoring data 340 may provide a metric characterizing the performance, from a user perspective, of a sector associated with a cell site 110-x. More specifically, user-base sector scoring data characterizes the throughput performance of a sector by calculating a weighted sum of device performance scores and normalizing the scaling of the weighted sum based on the mobile telephone number count and the number of total connections. The weights may be determined to emphasize a particular category of performance. In an embodiment, the UE-based sector score data may match user churn behavior that may be derived from an independent data source (e.g., a user study). Details of determining UE based sector scoring are described below in reference to FIG. 8.

The embodiment for optimization flow shown in FIG. 3 is merely one implementation. Other implementations may include fewer components, different components, differently arranged components, or additional components than illustrated in FIG. 3. Additionally or alternatively, one or more components of optimization flow 300 may perform functions described as being performed by one or more other components.

Figure 4:
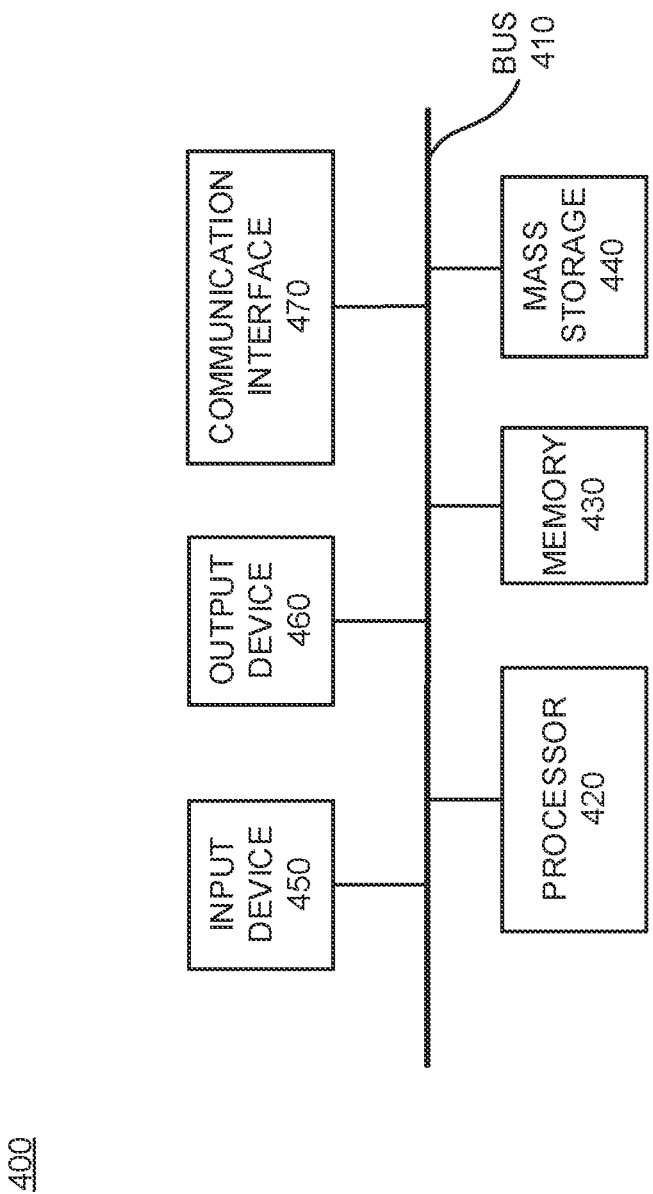
FIG. 4 is a block diagram illustrating components of an exemplary network device according to an embodiment.

FIG. 4 is a block diagram showing exemplary components of a network device 400. Network device 400 may be implemented in one or more components that reside in WWAN 100 and/or may be a stand-alone device, such as, for example, NMS 124, or may be instantiated in software in another network device that may, for example, be included in core 130. Alternatively, network device 400 may reside outside WWAN 100 and be functionally coupled to WAN 122 and/or core 130. Network device 400 may include a bus 410, a processor 420, a memory 430, mass storage 440, an input device 450, an output device 460, and a communication interface 470.

Bus 410 includes a path that permits communication among the components of network device 400. Processor 420 may include any type of single-core processor, multi-core processor, microprocessor, latch-based processor, and/or processing logic (or families of processors, microprocessors, and/or processing logics) that interprets and executes instructions. In other embodiments, processor 420 may include an application-specific integrated circuit (ASIC), a field-programmable gate array (FPGA), and/or another type of integrated circuit or processing logic. For example, processor 420 may be an x86 based CPU, and may use any operating system, which may include varieties of the Windows, UNIX, and/or Linux. Processor 420 may also use high-level analysis software packages and/or custom software written in any programming and/or scripting languages for interacting with other network entities.

Memory 430 may include any type of dynamic storage device that may store information and/or instructions, for execution by processor 420, and/or any type of non-volatile storage device that may store information for use by processor 420. For example, memory 430 may include a random access memory (RAM) or another type of dynamic storage device, a read-only memory (ROM) device or another type of static storage device, and/or a removable form of memory, such as a flash memory. Mass storage device 440 may include any type of on-board device suitable for storing large amounts of data, and may include one or more hard drives, solid state drives, and/or various types of Redundant Array of Independent Disk (RAID) arrays.

Input device 450, which may be optional, can allow an operator to input information into network device 400, if required. Input device 450 may include, for example, a keyboard, a mouse, a pen, a microphone, a remote control, an audio capture device, an image and/or video capture device, a touch-screen display, and/or another type of input device. In some embodiments, network device 400 may be managed remotely and may not include input device 450. Output device 460 may output information to an operator of network device 400. Output device 460 may include a display (such as a Liquid Crystal Display (LCD)), a printer, a speaker, and/or another type of output device. In some embodiments, network device 400 may be managed remotely and may not include output device 460.

Communication interface 470 may include a logical component that includes input and/or output ports, input and/or output systems, and/or other input and output components that facilitate the transmission of data to other devices. For example, communication interface 470 may include a network interface card (e.g., Ethernet card) for wired communications and/or a wireless network interface (e.g., a Wi-Fi) card for wireless communications. Communication interface 470 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 470 may further include one or more wired and/or wireless Radio Frequency (RF) transceivers that enable communications with WWAN 100 and/or other network devices (e.g., core 130) in WWAN 100. An RF transceiver may include an RF transmitter that receives signals to be transmitted wirelessly and performs signal processing on the signals before providing the signals to an antenna assembly (not shown), and an RF receiver (not shown) that receives signals from the antenna assembly and performs signal processing on the received signals before providing the received signals to processor 420. For example, the RF transceiver may perform analog-to-digital and digital-to-analog conversion, modulation and demodulation, up-conversion and down-conversion, and/or amplification of signals.

As described below, network device 400 may perform certain operations relating to generating UE-based recommendation upgrades for WWAN 100. Network device 400 may perform these operations in response to processor 420 executing software instructions contained in a computer-readable medium, such as memory 430 and/or mass storage 440. The software instructions may be read into memory 430 from another computer-readable medium or from another device. The software instructions contained in memory 430 may cause processor 420 to perform processes described herein, such as, for example, processes flows diagrams shown in at least one of FIGS. 5-8. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of network device 400, in other implementations, network device 400 may include fewer components, different components, additional components, or differently arranged components than depicted in FIG. 4.

Figure 5:
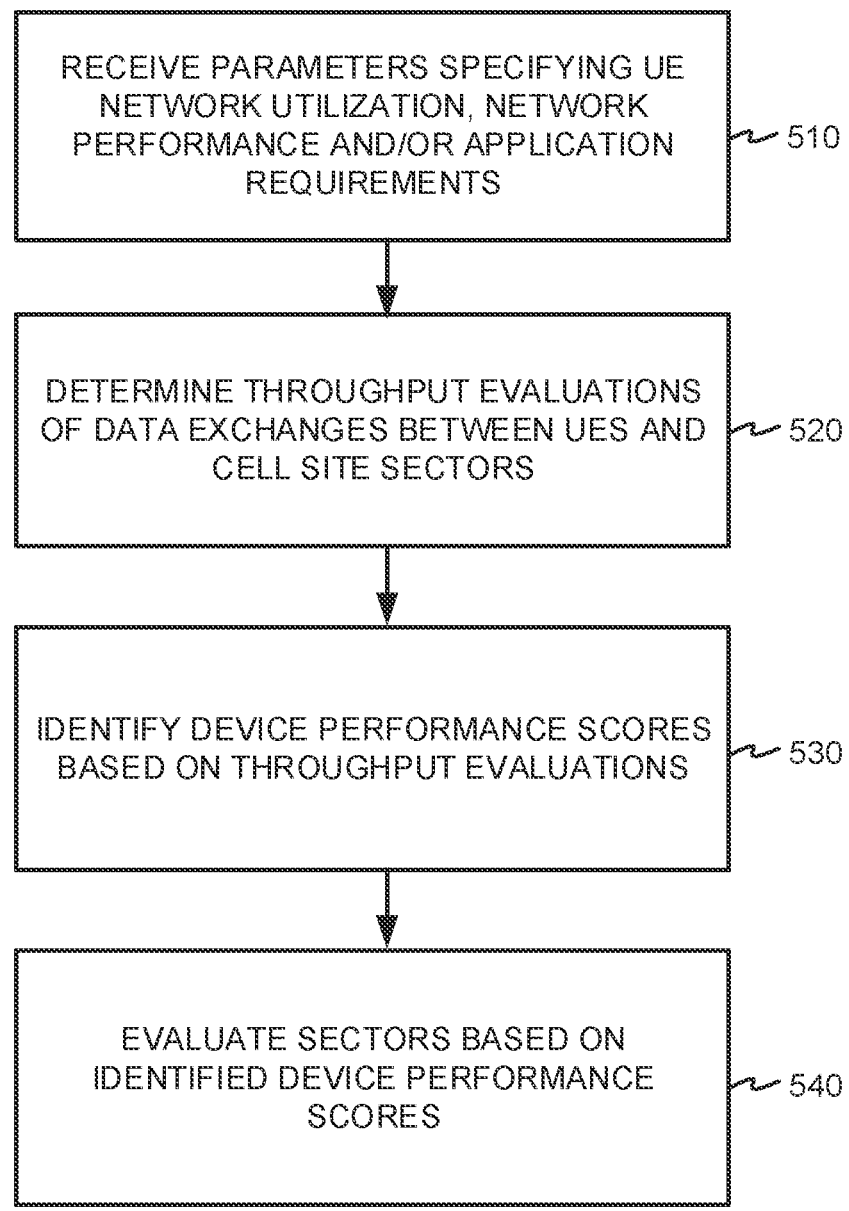
FIG. 5 is a flow chart showing an exemplary process for generating user equipment (UE) based recommendations for a network management system according to an embodiment.

FIG. 5 is a flow chart showing an exemplary process 500 for generating UE based recommendations for network management for WWAN 100 according to an embodiment. Process 500 may be performed by network device 400, which may be external to core 130 (e.g., implemented in NMS 124) and execute instructions by processor 420 for generating network management for WWAN 100. Alternatively, in another embodiment, network device 400 may be embodied as a network element residing in core 130 and perform additional standard network core functions in addition to generating network management for WWAN 100.

Processor 420 may receive parameters associated with UE network utilization, network performance, and/or application requirements (Block 510). In an embodiment, the received parameters may include UE data transactional information, network throughput performance, UE sector utilization, UE application classification, and/or application bandwidth requirements. Processor 420 may determine throughput evaluations of data exchanges between user UEs 120 and sectors of cell sites 110 (Block 520). Details of determining throughput evaluations are further described in reference to FIG. 6.

Further referring to FIG. 5, processor 420 may identify device performance scores based on the throughput evaluations. The device performance scores may be adjusted based on at least one independent metric (Block 530). Details of determining device performance scores are further described in reference to FIG. 7. Processor 420 may then evaluate sectors based on the identified device performance scores (Block 540). Details of determining UE based sector scoring are further described in reference to FIG. 8.

In an embodiment processor 420 may further recommend sector capacity optimizations to cell sites 110. The recommendations may include processor 420 applying the UE-based sector score within an objective function, and optimizing the objective function to increase throughput capacity of the sector. Processor 420 may then determine recommendations for sector optimizations based on the optimized objective function. In an embodiment, the determined recommendations may include recommendations to provide additional transmitters, provide additional carriers, provide improvements to a cell site antenna, provide additional spectrum, and/or provide an additional cell site.

Figure 6:
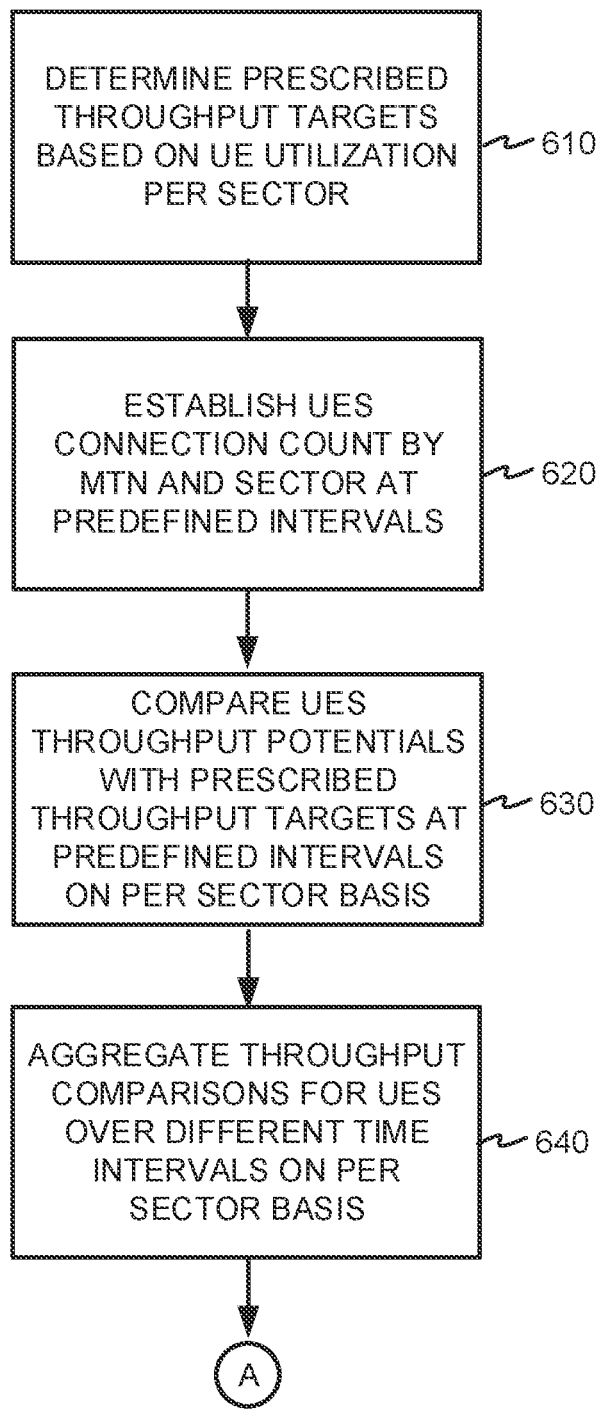
FIG. 6 is a flow chart illustrating details of determining throughput evaluations according to an exemplary embodiment.

FIG. 6 is a flow chart illustrating details of determining throughput evaluations according to an embodiment. Process 600 may be performed by network device 400, by processor 420 executing instructions to determine prescribed throughput targets based on UEs' 120 utilization associated with the sectors (Block 610). Processor 420 may establish UEs' 120 connections count by mobile telephone number at the sectors during predefined time intervals (Block 620). Processor 420 may compare UEs' 120 throughputs associated with the connections with the prescribed throughput targets (Block 630). Processor 420 may aggregate UEs' 120 throughput comparisons over the predefined time intervals associated with the sectors (Block 640). In an embodiment, determining the prescribed throughput targets may be based on an application category, data plan, and/or UE device type (e.g., smart phone, tablet, etc.).

Figure 7:
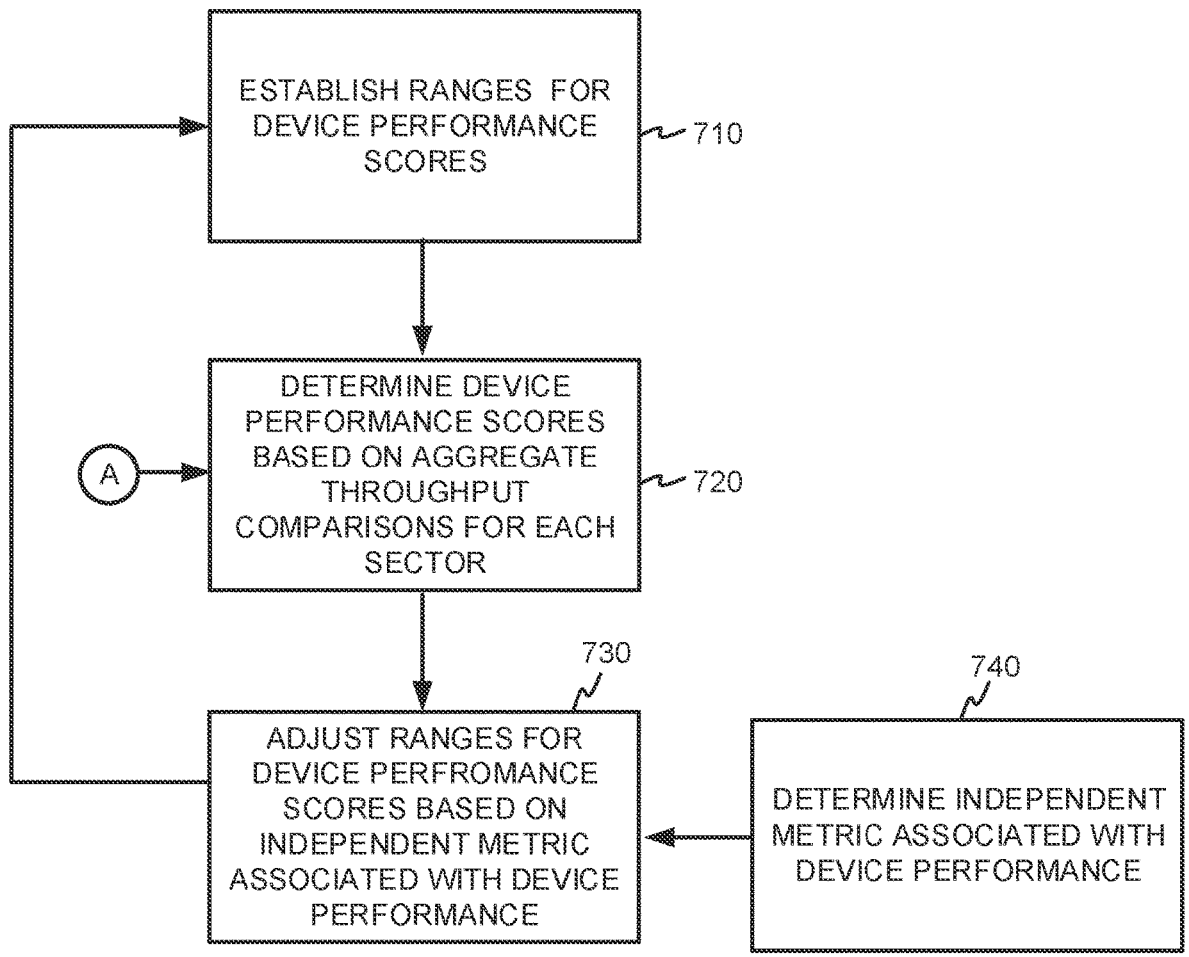
FIG. 7 is a flow chart illustrating an exemplary process determining device performance scores according to an embodiment.

FIG. 7 is a flow chart illustrating an exemplary process 700 determining device performance scores according to an embodiment. Process 700 may be performed by network device 400, by processor 420 establishing ranges associated with device performance scores (Block 710). Processor 420 may determine device performance score for UEs 120 based on aggregate throughput comparisons for each of the sectors (Block 720). Processor 420 may adjust each range of the plurality of ranges based on an independent metric associated with device performance (Block 730). In an embodiment, processor 420 may determine the independent metric by automatically tracking an event associated with connections between the UEs and sectors, and/or qualitative feedback from users (Block 740). For example, in an embodiment, an event associated with connections between the UEs 120 and sectors may include disconnection rates of wireless channels established between the UEs 120 and sectors.

Figure 8:
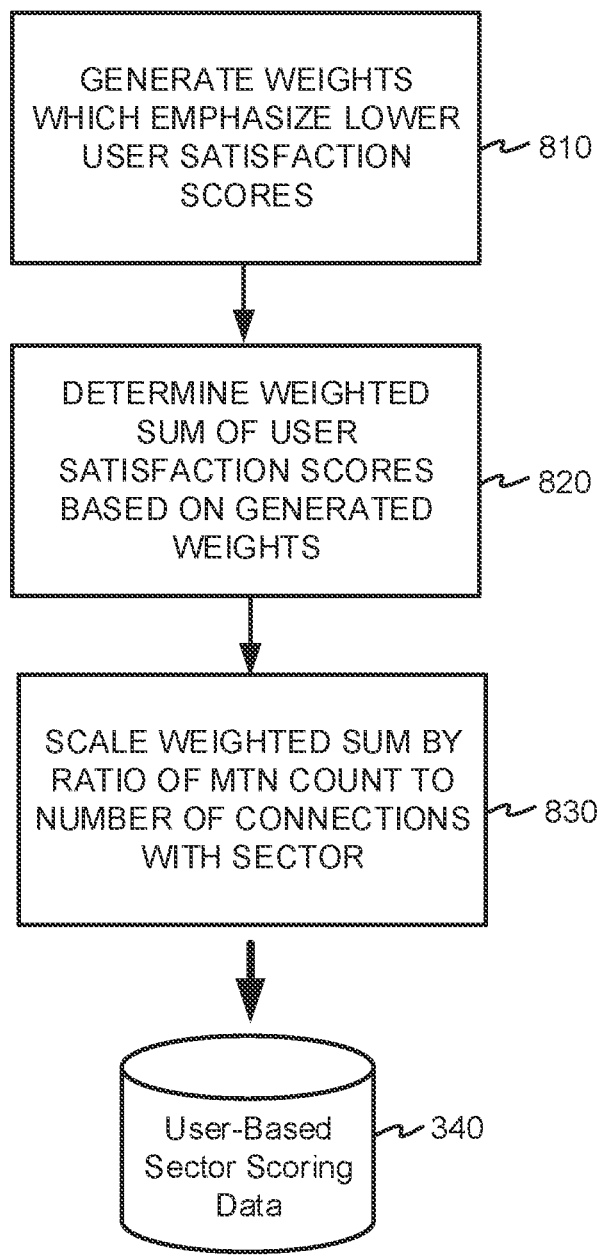
FIG. 8 is a flow chart illustrating an exemplary process determining UE based sector scoring according to an embodiment.

FIG. 8 is a flow chart illustrating an exemplary process 800 determining UE based sector scoring data 340 according to an embodiment. Process 800 may be performed by a network device 400, where processor 420 may generate weights which emphasize (e.g., more heavily weight) lower device performance scores (Block 810). Processor 420 may determine a weighted sum of device performance scores based on the generated weights (Block 820). Processor 420 may scale the weighted sum by the ratio of a mobile telephone number (MTN) count to a number of connections within a sector to determine the UE based sector scoring data 340 (Block 830), which may be used by optimization engine 310 as shown in FIG. 3.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5-8, the order of the blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   receiving parameters associated with at least one of a performance of a network, user equipment devices (UEs) network utilization, or application requirements;
   determining throughput evaluations of data exchanges between UEs and sectors associated with cell sites within the network;
   identifying device performance scores based on the throughput evaluations, wherein the identifying includes:
   establishing a plurality of ranges associated with the device performance scores,
   determining the device performance scores for the UEs based on aggregate throughput comparisons for each of the sectors, and
   adjusting each range of the plurality of ranges based on an independent metric associated with device performance; and
   evaluating the sectors based on the identified device performance scores.

2. The method of claim 1, wherein receiving parameters further comprises:
   receiving at least one of UE data transactional information, network throughput performance, UE sector utilization, UE application classification, or application bandwidth requirements.

3. The method of claim 1, wherein determining throughput evaluations of data exchanges comprises:
   determining prescribed throughput targets based on the UEs utilization associated with the sectors;
   establishing the UEs connections count by mobile telephone number at the sectors during predefined time intervals;
   comparing the UEs throughput potentials associated with the connections with the prescribed throughput targets; and
   aggregating the UEs throughput comparisons over the predefined time intervals associated with the sectors.

4. The method of claim 3, wherein determining the prescribed throughput targets is based on at least one of application category, data plan, or device type.

5. The method of claim 1, further comprising:
   determining the independent metric based on at least one of automatically tracking an event associated with connections between the UEs and the sectors, or qualitative feedback from users.

6. The method of claim 5, wherein an event associated with connections between the UEs and sectors includes disconnection rates of wireless channels established between the UEs and the sectors.

7. The method of claim 1, wherein evaluating the sectors based on the identified device performance scores further comprises:
   generating weights which emphasize lower device performance scores;
   determining a weighted sum of device performance scores based on the generated weights; and
   scaling the weighted sum by a ratio of a mobile telephone number (MTN) count to a number of connections within the sector.

8. The method of claim 1, further comprising:
   applying a UE based sector score within an objective function;
   optimizing the objective function to increase throughput capacity of a sector; and
   determining recommendations to the sector based on the optimized objective function.

9. The method of claim 8, wherein determining recommendations further comprises at least one of:
   providing additional transmitters, providing additional carriers, improving a cell site antenna, providing additional spectrum, or providing an additional cell site, based on the determined recommendations.

10. A device, comprising:
    an interface;
    a memory configured to store instructions; and
    a processor, coupled to the interface and the memory, wherein the processor is configured to execute the instructions stored in the memory to:
      receive parameters associated with at least one of a performance of a network, user equipment devices (UEs) network utilization, or user application requirements;
      determine throughput evaluations of data exchanges between UEs and sectors associated with cell sites within the network;
      determine at least one independent metric based on at least one of automatically tracking an event associated with connections between the UEs and the sectors, or qualitative feedback from users;
      identify device performance scores based on the throughput evaluations, wherein the device performance scores are adjusted based on the at least one independent metric; and
      evaluate the sectors based on the identified device performance scores.

11. The device of claim 10, wherein the instructions to receive parameters further cause the processor to:
    receive at least one of UE data transactional information, network throughput performance, UE sector utilization, UE application classification, or application bandwidth requirements.

12. The device of claim 10, wherein the instructions to determine throughput evaluations of data exchanges further cause the processor to:
    determine prescribed throughput targets based on the UEs utilization associated with the sectors;
    establish the UEs connections count by mobile telephone number at the sectors during predefined time intervals;
    compare the UEs throughputs associated with the connections with the prescribed throughput targets; and
    aggregate the UEs throughput comparisons over the predefined time intervals associated with the sectors.

13. The device of claim 12, wherein the instructions to determine the prescribed throughput targets further cause the processor to:
    determine the prescribed throughput targets based on at least one of application category, data plan, or device type.

14. The device of claim 10, wherein the instructions to identify device performance scores based on the throughput evaluations further cause the processor to:
    establish a plurality of ranges for associated with device performance scores;
    determine device performance score for the UEs based on aggregate throughput comparisons for each of the sectors; and
    adjust each range of the plurality of ranges based on an independent metric associated with device performance.

15. The device of claim 10, wherein the event associated with the connections between the UEs and the sectors includes disconnection rates of wireless channels established between the UEs and the sectors.

16. The device of claim 10, wherein the instructions to evaluate the sectors based on the identified device performance scores further cause the processor to:
    generate weights which emphasize lower device performance scores;
    determine a weighted sum of device performance scores based on the generated weights; and
    scale the weighted sum by the ratio of a mobile telephone number (MTN) count to a number of connections with sector.

17. The device of claim 10, wherein the instructions further cause the processor to:
    apply a UE based sector score within an objective function;
    optimize the object function to increase throughput capacity of a sector; and
    determine recommendations to the sector based on the optimized objective function.

18. A non-transitory computer-readable medium comprising instructions, which, when executed by a processor, cause the processor to:
    receive parameters associated with at least one of a performance of a network, user equipment devices (UEs) network utilization, or user application requirements;
    determine throughput evaluations of data exchanges between UEs and sectors associated with cell sites within the network;
    determine at least one independent metric based on at least one of automatically tracking an event associated with connections between the UEs and the sectors, or qualitative feedback from users;
    identify device performance scores based on the throughput evaluations, wherein the device performance scores are adjusted based on the at least one independent metric; and
    evaluate sectors based on the identified device performance scores.

19. The non-transitory computer-readable medium of claim 18, wherein the instructions further cause the processor to:
    establish a plurality of ranges for associated with device performance scores;

determine device performance score for the UEs based on aggregate throughput comparisons for each of the sectors; and adjust each range of the plurality of ranges based on an independent metric associated with device performance.

20. A non-transitory computer-readable medium of claim 18, wherein the instructions further cause the processor to:
generate weights which emphasize lower device performance scores;
determine a weighted sum of device performance scores based on the generated weights; and
scale the weighted sum by a ratio of a mobile telephone number (MTN) count to a number of connections within the sector.

21. A method, comprising:
receiving parameters associated with at least one of a performance of a network, user equipment devices (UEs) network utilization, or user application requirements;
determining throughput evaluations of data exchanges between UEs and sectors associated with cell sites within the network;
detemiining at least one independent metric based on at least one of automatically tracking an event associated with connections between the UEs and the sectors, or qualitative feedback from users:
identifying device performance scores based on the throughput evaluations, wherein the device performance scores are adjusted based on the at least one independent metric; and
evaluating sectors based on the identified device performance scores.

22. The method of claim 21, wherein receiving parameters includes:
receiving at least one of UE data transactional information, network throughput performance, UE sector utilization, UE application classification, or application bandwidth requirements.

23. The method of claim 21, wherein determining throughput evaluations of data exchanges includes:
determining prescribed throughput targets based on the UEs utilization associated with the sectors;
establishing the UEs connections count by mobile telephone number at the sectors during predefined time intervals;
comparing the UEs throughputs associated with the connections with the prescribed throughput targets; and
aggregating the UEs throughput comparisons over the predefined time intervals associated with the sectors.

24. The method of claim 21, wherein identifying device performance scores based on the throughput evaluations includes:
establishing a plurality of ranges for associated with device performance scores;
determining device performance score for the UEs based on aggregate throughput comparisons for each of the sectors; and
adjusting each range of the plurality of ranges based on an independent metric associated with device performance.

25. The method of claim 21, wherein evaluating the sectors based on the identified device performance scores includes:
generating weights which emphasize lower device performance scores;
determining a weighted sum of device performance scores based on the generated weights; and
scaling the weighted sum by the ratio of a mobile telephone number (MTN) count to a number of connections with sector.

* * * * *